(12) United States Patent
Kienzle et al.

(10) Patent No.: US 9,007,955 B1
(45) Date of Patent: Apr. 14, 2015

(54) SYSTEMS AND METHODS FOR MAPPING NETWORK TOPOLOGIES

(75) Inventors: Darrell Kienzle, Vienna, CA (US); Matthew Cruz Elder, Germantown, MD (US); Ryan Persaud, Fairfax, VA (US)

(73) Assignee: Symantec Corporation, Mountain View, CA (US)

( * ) Notice: Subject to any disclaimer, the term of this patent is extended or adjusted under 35 U.S.C. 154(b) by 513 days.

(21) Appl. No.: 13/043,038

(22) Filed: Mar. 8, 2011

(51) Int. Cl.
*H04L 12/28* (2006.01)
*H04L 12/24* (2006.01)

(52) U.S. Cl.
CPC ..................................... *H04L 41/12* (2013.01)

(58) Field of Classification Search
None
See application file for complete search history.

(56) References Cited

U.S. PATENT DOCUMENTS

| | | | | |
|---|---|---|---|---|
| 5,668,952 | A * | 9/1997 | Slane | 370/254 |
| 6,865,160 | B1 * | 3/2005 | Bare | 370/256 |
| 7,072,952 | B2 * | 7/2006 | Takehiro et al. | 370/254 |
| 7,349,348 | B1 * | 3/2008 | Johnson et al. | 370/254 |
| 8,107,396 | B1 * | 1/2012 | Sharma | 370/254 |
| 8,375,125 | B1 * | 2/2013 | Wu et al. | 709/224 |
| 2004/0167988 | A1 * | 8/2004 | Rune et al. | 709/238 |
| 2006/0250984 | A1 * | 11/2006 | Sihn et al. | 370/255 |
| 2007/0245033 | A1 * | 10/2007 | Gavrilescu et al. | 709/230 |
| 2009/0285127 | A1 * | 11/2009 | Black et al. | 370/255 |
| 2010/0074142 | A1 * | 3/2010 | Park et al. | 370/254 |
| 2010/0189012 | A1 * | 7/2010 | Shibuya et al. | 370/254 |
| 2012/0130959 | A1 * | 5/2012 | Wu | 707/687 |
| 2013/0039218 | A1 * | 2/2013 | Narasimhan et al. | 370/255 |

OTHER PUBLICATIONS

Richard Black et al.; Ethernet Topology Discovery Without Network Assistance; IEEE International Conference on Network Protocols; 2004.
Simon Thoustrup; Layer 2 Topology Discovery; Technical University of Denmark; Jan. 20, 2006.
Microsoft Windows; LLTD: Link Layer Topology WDiscovery Protocol; A Windows Rally Specification; Sep. 15, 2006.
Kaveh Taghi-Zadeh; Understanding Layer 2 Discovery; HP IT Resource Center; http://forums11.itrc.hp.com/service/forums/questionanswer.
do?admit=109447626+1299607860566+28353475&threadId=11892; Taken from site on Mar. 8, 2011.
Bruce Boardman; Layer 2 Layout: Layer 2 Discovery Digs Deep; Network Computing for IT by IT; Nov. 6, 2003.
Solarwinds; LANsurveyor: Map Your Network Automatically in Just Minutes; http://www.solarwinds.com/products/LANsurveyor/network_diagram.aspx; Taken from site on Mar. 8, 2011.
Hwa-Chun Lin et al.; Automatic Link Layer Topology Discovery of IP Networks; Department of Computer Science, National Tsing Hua University; 1999.

* cited by examiner

*Primary Examiner* — Timothy J Weidner
(74) *Attorney, Agent, or Firm* — ALG Intellectual Property, LLC

(57) ABSTRACT

A computer-implemented method for mapping network topologies may include (1) identifying a network including a plurality of network switches and a plurality of host systems, (2) identifying a host system within the plurality of host systems connected to the network via a network switch within the plurality of network switches, (3) refreshing an address of the host system within the network switch, (4) allowing the address of the host system to expire from each network switch within the plurality of network switches except the network switch, (5) transmitting a probing frame from a probing host system within the plurality of host systems to the address of the host system, (6) identifying a subset of host systems within the plurality of host systems that received the probing frame, and then (7) mapping a topology of the network based on the identified subset. Various other methods, systems, and computer-readable media are also disclosed.

14 Claims, 12 Drawing Sheets

SYSTEMS AND METHODS FOR MAPPING NETWORK TOPOLOGIES

GOVERNMENT LICENSE RIGHTS

This Invention was made with Government support under FA8750-10-9-0110 awarded by Air Force Research Laboratory/RIKE, Rome Research Site, 26 Electronic Parkway, Rome, N.Y. 13441. The Government has certain rights in the Invention.

BACKGROUND

Consumers and organizations may spend a considerable amount of resources configuring and troubleshooting local area networks ("LANs"). In many cases, consumers and organizations may wish to discover details about the topology of their LANs in order to more efficiently configure, troubleshoot, and/or maintain their LANs. While the transparent functionality afforded by some networking protocols may simplify the operation of a LAN, it may also make gathering information about the infrastructure on which those protocols operate more difficult. More specifically, transparent bridging performed by layer-2 switches may enable a LAN to function without an understanding of the layer-2 topology of the LAN. Accordingly, many LANs may exist without configuration information that specifies their topology.

Traditional technologies for discovering the layer-2 topology of LANs may leverage management capabilities of some layer-2 switches. For examples, these technologies may use the Simple Network Management Protocol ("SNMP") to communicate with layer-2 switches and gather information useful for constructing a topology of a LAN. Unfortunately, these technologies may have several drawbacks. For example, these technologies may require an administrator to have a certain level of knowledge about the topology of a LAN. Furthermore, these technologies may require administrative privileges to access relevant network management data. However, due to organizational division of responsibilities, an administrator requiring network topological information may not have the necessary privileges. Additionally, these technologies may not work at all with unmanaged layer-2 switches.

An alternative approach may attempt to infer information about the layer-2 topology of a LAN by spoofing Media Access Control ("MAC") addresses when transmitting frames across the network. Unfortunately, this approach may fail in network environments that implement MAC filtering to prevent spoofing. Accordingly, the instant disclosure identifies a need for additional and improved systems and methods for mapping network topologies.

SUMMARY

As will be described in greater detail below, the instant disclosure generally relates to systems and methods for mapping network topologies. In some examples, the systems described herein may accomplish such a task by (1) identifying a network including a plurality of network switches and a plurality of host systems and (2) identifying a host system within the plurality of host systems connected to the network via a network switch within the plurality of network switches; then, during a training period, (3) refreshing an address of the host system within the network switch and (4) allowing the address of the host system to expire from each network switch within the plurality of network switches except the network switch; then, following the training period, (5) transmitting a probing frame from a probing host system within the plurality of host systems to the address of the host system, (6) identifying a subset of host systems within the plurality of host systems that received the probing frame, and (7) mapping a topology of the network based at least in part on the identified subset.

The network may include any suitable type of network. For example, the network may include a tree network. In some examples, the network may include an Ethernet network. Each switch within the plurality of switches may include a data-link-layer switch. The address of the host system may include a media access control address.

In some examples, the systems described herein may refresh the address of the host system by transmitting from the host system at least one training frame addressed to the host system. Likewise, the systems described herein may allow the address of the host system to expire from each network switch within the plurality of network switches (except for the network switch to which the host is directly attached) by transmitting no frames from the host system during the training period that are not addressed to the host system. In some examples, allowing the address of the host system to expire may include waiting for a predetermined amount of time during the training period.

Mapping the topology of the network may include a variety of steps. For example, mapping the topology of the network may include (1) determining that the subset of host systems only comprises the host system and (2) determining that the probing host system is connected to the network via the network switch. Additionally or alternatively, mapping the topology of the network may include (1) determining that the subset of host systems does not only comprise the host system and (2) determining that the subset of host systems, excepting the host system, belongs to a common branch of the network with the probing host system, with the common branch extending from the network switch as a root of the network.

In some additional examples, the systems described herein may (1) identify a network including a plurality of network switches and a plurality of host systems, (2) identify a node within the network (e.g., a node that does not participate in the mapping process described above); then, during a training period, (3) ping the node from a host system within the network and (4) allow the address of the host system to expire from each network switch within the plurality of network switches; and then, following the training period, (5) transmit a probing frame from a probing host system within the network to the host system, (6) determine whether any host system within the network received the probing frame apart from the host system, and (7) map a topology of the network based at least in part on the determination.

In these additional examples, the systems described herein may map the topology of the network in part by determining whether a network switch connecting the probing host system to the network lies on a path between the node and a network switch connecting the host system to the network (e.g., based on the determination of whether any host system within the network received the probing frame apart from the host system).

The node may include any suitable device and/or system. For example, the node may include a printer, a router, and/or a rogue host system.

By training some switches to retain certain host addresses while allowing host addresses within other switches to expire and then probing certain host addresses to detect frame flooding patterns, the systems and methods described herein may gather topological information on networks without relying on management protocols or MAC address spoofing. These systems and methods may therefore successfully map networks with unmanaged switches and/or with MAC filtering.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
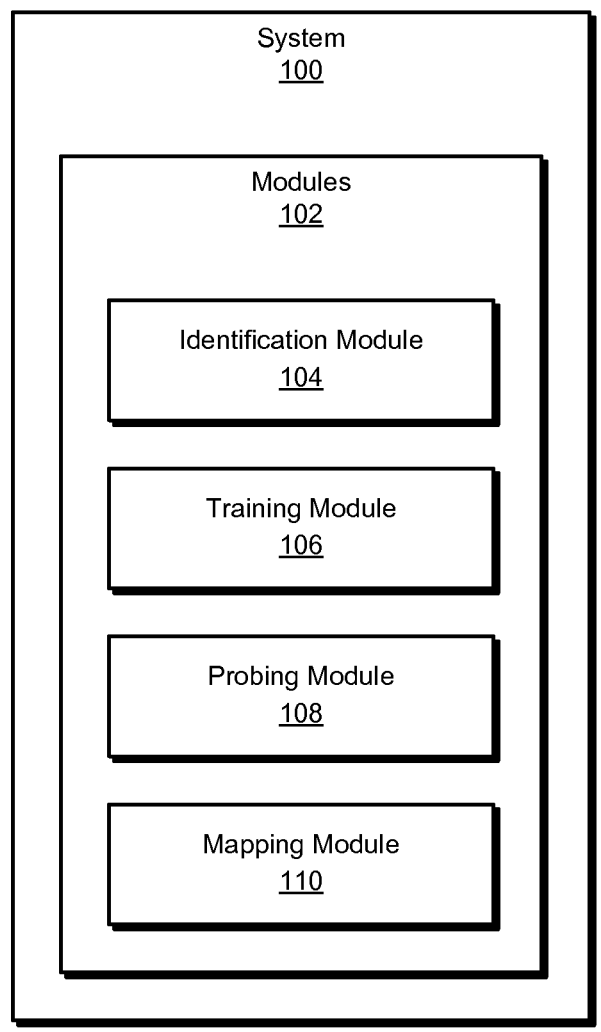
FIG. 1 is a block diagram of an exemplary system for mapping network topologies.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
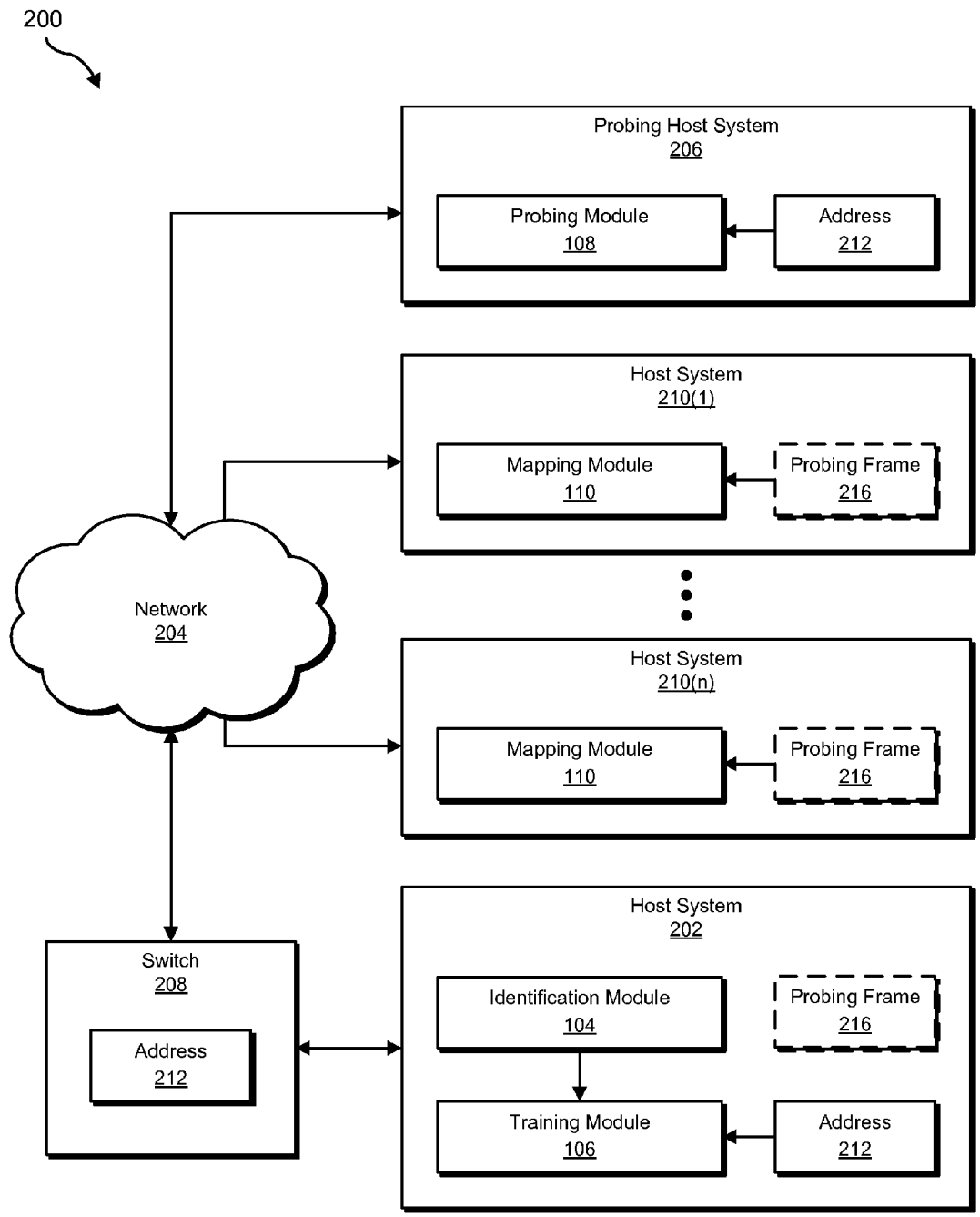
FIG. 2 is a block diagram of an exemplary system for mapping network topologies.
Figure 3:
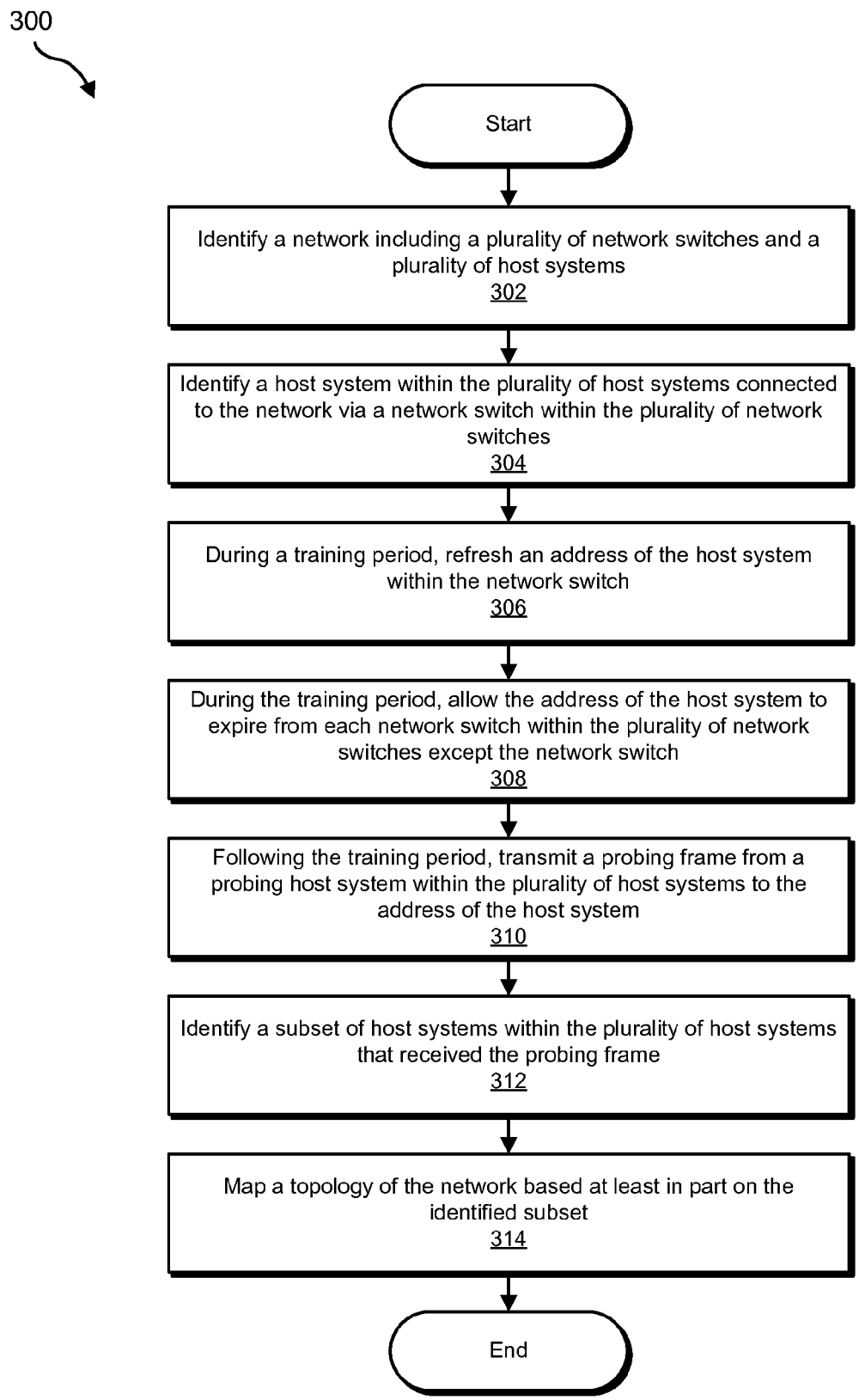
FIG. 3 is a flow diagram of an exemplary method for mapping network topologies.
Figure 4:
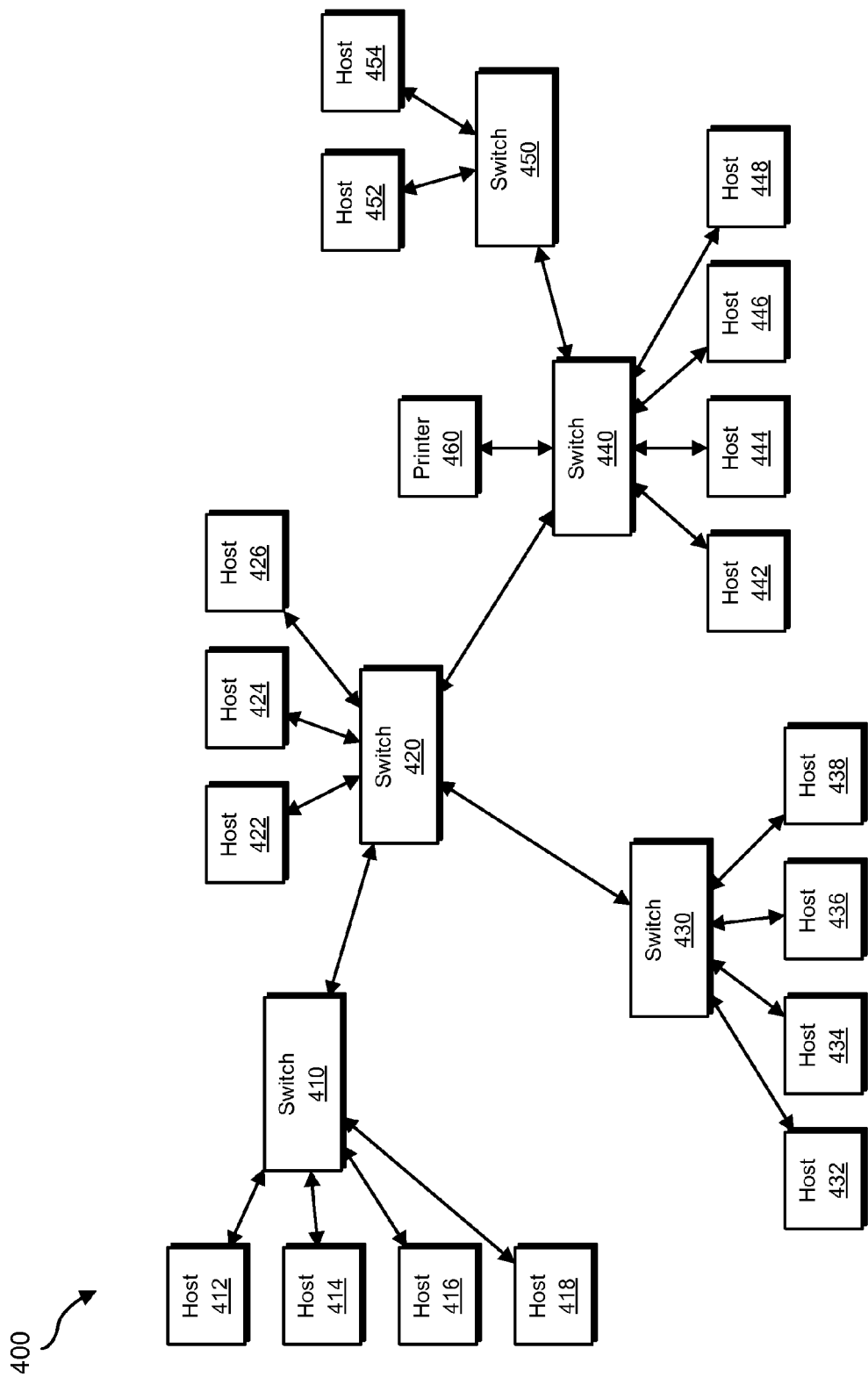
FIG. 4 is a block diagram of an exemplary network.

The following will provide, with reference to FIGS. 1, 2 and 4, detailed descriptions of exemplary systems for mapping network topologies. Detailed descriptions of corresponding computer-implemented methods will also be provided in connection with FIGS. 3 and 10. Detailed descriptions of an exemplary network will be provided in connection with FIGS. 5-9. In addition, detailed descriptions of an exemplary computing system and network architecture capable of implementing one or more of the embodiments described herein will be provided in connection with FIGS. 11 and 12, respectively.

FIG. 1 is a block diagram of an exemplary system 100 for mapping network topologies. As illustrated in this figure, exemplary system 100 may include one or more modules 102 for performing one or more tasks. For example, and as will be explained in greater detail below, exemplary system 100 may include an identification module 104 programmed to (1) identify a network including a plurality of network switches and a plurality of host systems and (2) identify a host system within the plurality of host systems connected to the network via a network switch within the plurality of network switches. Exemplary system 100 may also include a training module 106 programmed to, during a training period, (1) refresh an address of the host system within the network switch and (2) allow the address of the host system to expire from each network switch within the plurality of network switches except the network switch. Exemplary system 100 may also include a probing module 108 programmed to transmit a probing frame from a probing host system within the plurality of host systems to the address of the host system.

In addition, and as will be described in greater detail below, exemplary system 100 may include a mapping module 110 programmed to (1) identify a subset of host systems within the plurality of host systems that received the probing frame and (2) map a topology of the network based at least in part on the identified subset. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., host system 202, probing host system 206, and/or host systems 210(1)-(n)), computing system 1110 in FIG. 11, and/or portions of exemplary network architecture 1200 in FIG. 12. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a host system 202, a probing host system 206, a switch 208, and host systems 210(1)-(n) connected via a network 204. In one embodiment, and as will be described in greater detail below, one or more of modules 102 from FIG. 1 may program host system 202, probing host system 206, and/or host systems 210(1)-(n) to map the topology of network 204 by (1) identifying a network (e.g. network 204) including a plurality of network switches and a plurality of host systems (e.g., host system 202, probing host system 206, and host systems 210(1)-(n)) and (2) identifying a host system within the plurality of host systems (e.g., host system 202) connected to the network via a network switch within the plurality of network switches (e.g., switch 208); then, during a training period, (3) refreshing an address of the host system within the network switch (e.g., an address 212) and (4) allowing the address of the host system to expire from each network switch within the plurality of network switches except the network switch (e.g., allowing address 212 to expire from all switches within network 204 but not switch 208); then, following the training period, (5) transmitting a probing frame (e.g., a probing frame 216) from a probing host system within the plurality of host systems (e.g., probing host system 206) to the address of the host system (e.g., to host system 202), (6) identifying a subset of host systems within the plurality of host systems that received the probing frame (e.g., which of host systems 210(1)-(n) received probing frame 216), and (7) mapping a topology of the network based at least in part on the identified subset.

Host system 202 generally represents any type or form of computing device capable of reading computer-executable instructions. Examples of host system 202 include, without limitation, laptops, desktops, servers, cellular phones, personal digital assistants (PDAs), multimedia players, embedded systems, combinations of one or more of the same, exemplary computing system 1110 in FIG. 11, or any other suitable computing device.

Probing host system 206 generally represents any type or form of computing device capable of reading computer-executable instructions. Examples of probing host system 206 include, without limitation, laptops, desktops, servers, cellular phones, personal digital assistants (PDAs), multimedia players, embedded systems, combinations of one or more of the same, exemplary computing system 1110 in FIG. 11, or any other suitable computing device.

Host systems 210(1)-(*n*) generally represent any type or form of computing device capable of reading computer-executable instructions. Examples of host systems 210(1)-(*n*) include, without limitation, laptops, desktops, servers, cellular phones, personal digital assistants (PDAs), multimedia players, embedded systems, combinations of one or more of the same, exemplary computing system 1110 in FIG. 11, or any other suitable computing device.

Network 204 generally represents any medium or architecture capable of facilitating communication or data transfer. Examples of network 204 include, without limitation, a local area network (LAN), an intranet, a wide area network (WAN), a personal area network (PAN), the Internet, power line communications (PLC), a cellular network (e.g., a GSM Network), exemplary network architecture 1200 in FIG. 12, or the like. Network 204 may facilitate communication or data transfer using wireless or wired connections.

Switch 208 generally represents any device capable of transparent bridging. Examples of switch 208 include, without limitation, a layer-2 network switch and/or bridge.

FIG. 3 is a flow diagram of an exemplary computer-implemented method 300 for mapping network topologies. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a network including a plurality of network switches and a plurality of host systems. For example, at step 302 identification module 104 may, as part of host system 202 in FIG. 2, identify network 204.

The network may have any suitable structure. In some examples, the network may include a tree network. As used herein, the phrase "tree network" may refer to any switched network with only one path between any two switches (and, accordingly, any two hosts). For example, the topology of a tree network may include no cycles. Using FIG. 4 as an example, exemplary network 400 may include switches 410, 420, 430, 440, and 450. Network 400 may represent a tree network since there are no cyclical paths between the switches. For example, there is a path from switch 420 to switch 430 and a path from switch 420 to switch 440 but no path from switch 430 to switch 440.

As will be described in greater detail below, by ensuring that the network may be represented as a tree network, the systems described herein may make inferences about the topology of the network based on which host systems receive frames from each other under certain conditions. In some examples, identification module 104 may perform a spanning tree protocol capable of detecting any cycles in the network and disabling one or more links within these cycles to enforce a tree topology. Additionally or alternatively, identification module 104 may simply assume a tree topology (e.g., leaving a network administrator to ensure the tree topology).

In some examples, the network may employ a shared bus model that relies on collision detection to ensure that all packets are transmitted correctly. Accordingly, the plurality of switches within the network may help to reduce the number of collisions by filtering frames when expedient rather than flooding the entire network with every frame. Additionally or alternatively, the network may include a local area network. For example, the network may include an Ethernet network.

As used herein, the term "network switch" may refer to any device capable of forwarding and flooding frames as necessary to deliver frames to their destinations on the network. Examples of network switches include, without limitation, network bridges, data-link-layer switches, and layer-2 switches. As used herein, the phrase "layer 2" may refer to the second layer (i.e., the data link layer) within the Open Systems Interconnection ("OSI") model of networking and/or any analogous networking layer. In some examples, each network switch within the plurality of network switches may include a layer-2 switch. Additionally, in some examples one or more of the plurality of network switches may include unmanaged switches. For example, one or more of the plurality of network switches may have limited or no configuration and/or interface options. For example, one or more of the plurality of network switches may not support the Simple Network Management Protocol. Additionally or alternatively, one or more of the plurality of network switches may only provide a single layer of OSI functionality. In some examples, one or more of the plurality of network switches may employ a forwarding table and/or a forwarding information base to associate host addresses (e.g., media access control addresses) with a switch interface and/or port. For example, a network switch may associate a port with a host address upon receiving a frame originating from the host address at that port. The network switch may later forward frames destined for the host address to the recorded port instead of flooding the frames to every port. As used herein, the term "frame" may generally refer to a data-link frame.

In some examples, each host system within the plurality of host systems may host an agent including one or more of modules 102. As will be described in greater detail below, these agents may coordinate the traffic they send out and share information about the traffic they receive in order to discover the layer 2 topology between them.

Figure 5:
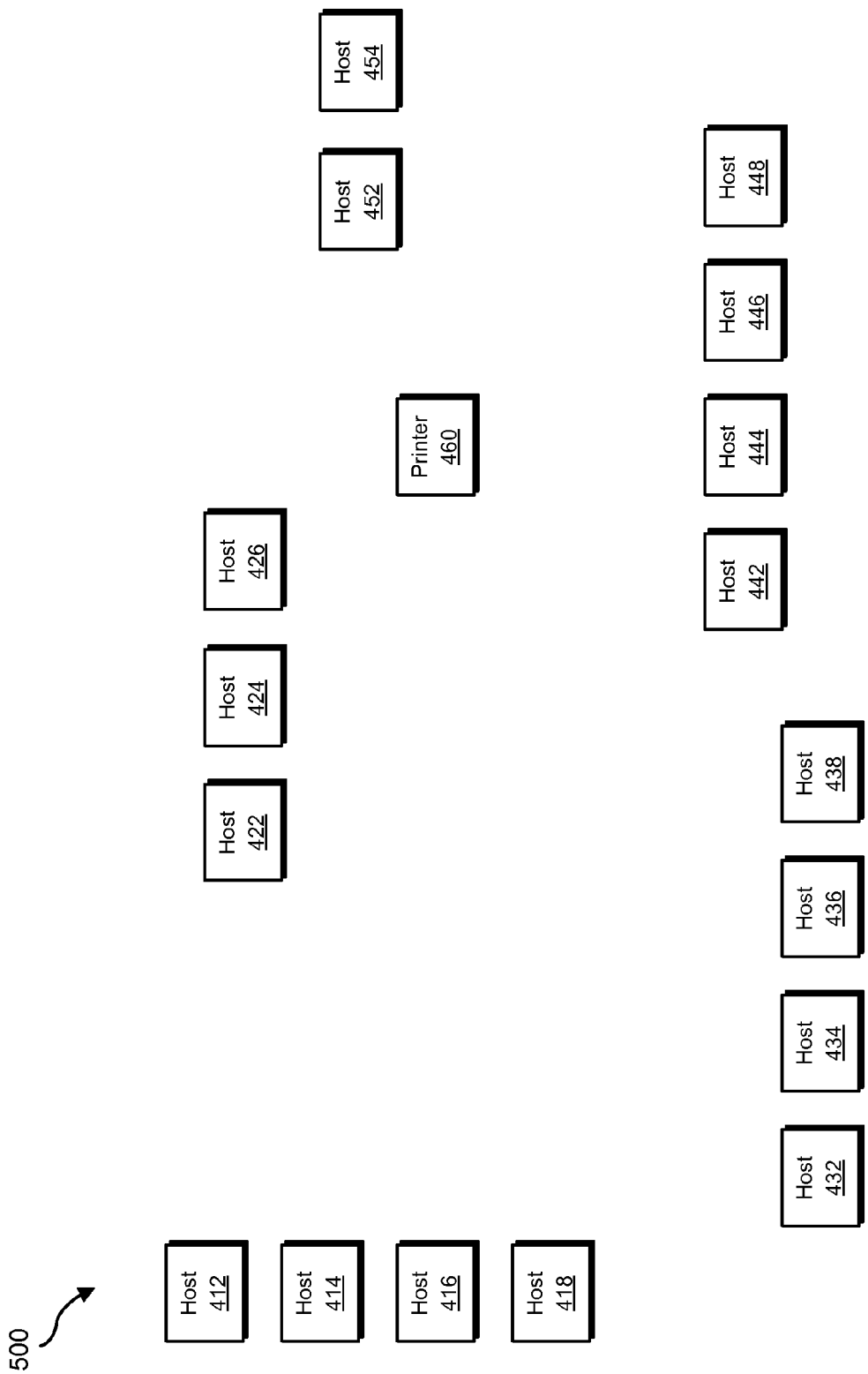
FIG. 5 is a block diagram of an exemplary network map.

FIG. 5 is a block diagram of an exemplary network map 500 of network 400. Using FIG. 5 as an example, at step 302 identification module 104 may identify network 400 but may initially only know that the various hosts (e.g., hosts 412, 414, 416, 418, 422, 424, 426, 432, 434, 436, 438, 442, 444, 446, 448, 452, and 454) and a printer 460 coexist on network 400. Accordingly, network map 500 may represent an initial state of a map of the topology of network 400. In some examples, identification module 104 may execute on one or more of the various hosts depicted in FIGS. 4 and 5.

Identification module 104 may identify the network in any suitable manner. For example, identification module 104 may read a configuration file identifying the network. Additionally or alternatively, identification module 104 may receive an input/output handle to access the network. In some examples, identification module 104 may identify the network by executing on a host system on the network.

Returning to FIG. 3, at step 304 one or more of the systems described herein may identify a host system within the plurality of host systems connected to the network via a network switch within the plurality of network switches. For example, at step 304 identification module 104 may, as part of host system 202 in FIG. 2, identify host system 202 connected to switch 208. Using FIG. 4 as an additional example, identification module 104 may identify host 424 connected to switch 420.

Identification module 104 may perform step 304 in any suitable manner. For example, identification module 104 may identify the host system by reading a configuration file identifying the host system. Additionally or alternatively, identification module 104 may identify the host system simply by executing on the host system.

At step 306, one or more of the systems described herein may, during a training period, refresh an address of the host system within the network switch. For example, at step 306 training module 106 may, as part of host system 202 in FIG. 2, refresh address 212 of host system 202 within switch 208. Using FIG. 4 as an additional example, at step 306 training module 106 may, as part of host 424, refresh the address of host 424 within switch 420.

The address of the host system may include any address used for forwarding layer 2 frames. For example, the address of the host system may include a Media Access Control ("MAC") address.

As mentioned earlier, the network switch may include a forwarding table. When the network switch receives a frame via a port, the network switch may associate the MAC address of origin of the frame with the port in the forwarding table. When the network switch subsequently receives another frame destined for a MAC address stored in the forwarding table, the network switch may forward the frame only to the corresponding port in the forwarding table rather than flooding all ports with the frame. However, MAC addresses may expire from the forwarding table after a period of time with no activity from the MAC address (e.g., five minutes). Accordingly, in some examples, training module 106 may refresh the address of the host system within the network switch by transmitting from the host system at least one training frame addressed to the host system. When the training frame reaches the network switch, the network switch may record and/or refresh a record in a forwarding table designating the port connecting the network switch to the host system.

Training module 106 may perform step 106 in any suitable manner. For example, training module 106 may transmit a frame from the host system on the data-link layer of the network with the MAC address of the host system as the destination address. Additionally or alternatively, training module 106 may transmit a packet, a segment, and/or a higher-level data unit that will include a frame with the MAC address of the host system. In some examples, training module 106 may continuously transmit frames from the host system and addressed to the host system during the training period. Additionally or alternatively, training module 106 may periodically transmit frames from the host system and addressed to the host system (e.g., with a period below the time it takes for an address to expire from the forwarding table of the network switch). In some examples, training module 106 may transmit a single frame from the host system and addressed to the host system shortly before the training period ends (e.g., such that a probing frame, which will be described in greater detail below, will reach the network switch before the address expires from the network switch).

Generally, training module 106 may transmit a frame to any address such that the network switch will not flood the frame to all ports. For example, training module 106 may transmit the frame to a multicast address guaranteed to never cause the network switch to flood according to one or more specifications to which the network switch adheres.

Returning to FIG. 3, at step 308 one or more of the systems described herein may, during the training period, also allow the address of the host system to expire from each network switch within the plurality of network switches except the network switch. For example, at step 308 training module 106 may, as part of host system 202 in FIG. 2, allow address 212 to expire from all network switches within network 204 except switch 208. Using FIG. 4 as an additional example, at step 308 training module 106 may, as part of host 424, allow the address of host 424 to expire from switches 410, 430, 440, and 450.

Training module 106 may perform step 308 in any suitable manner. For example, training module 106 may allow the address of the host system to expire in the remaining network switches by not transmitting any frames from the host system during the training period that are not addressed to the host system. In some examples, training module 106 may block all outgoing network traffic from the host system (besides training frames addressed to the host system). In order to ameliorate the cost of blocking outgoing network traffic, in some examples training module 106 may wait to initiate the training period until the host system is idle (e.g., when a user logs out off and/or locks the host system, during a screensaver, etc.). In these examples, training module 106 may also coordinate with the probing host system described below so that the probing host system sends the probing frame after the training period is over.

In some examples, training module 106 may ensure that the address of the host system expires from the remaining network switches by waiting for a predetermined amount of time during the training period. For example, training module 106 may wait for five minutes, ten minutes, and/or any an amount of time as specified by a standard and/or a configuration of the network switches for forwarding table entry expiry. In some examples, training module 106 may determine the amount of time necessary to wait by checking the time of the last outgoing frame. For example, if training module 106 is configured to wait ten minutes and training module 106 had recently sent a frame addressed to the host system, but the host system has not sent any other frames across the network in the past seven minutes, training module 106 may determine that the training period only requires three minutes to allow the address of the host system to expire from all remaining network switches.

Returning to FIG. 3, at step 310 one or more of the systems described herein may, following the training period, transmit a probing frame from a probing host system within the plurality of host systems to the address of the host system. For example, at step 310 probing module 108 may, as part of probing host system 206 in FIG. 2, transmit probing frame 216 from probing host system 206 to address 212 of host system 202. Using FIG. 4 as an additional example, at step 310 probing module 108 may, as part of host 426, transmit a probing frame from host 426 to the address of host 424.

Probing module 108 may perform step 310 in any suitable manner. For example, probing module 108 may transmit a frame from the probing host system on the data-link layer of the network with the MAC address of the host system as the destination address. Additionally or alternatively, probing module 108 may transmit a packet, a segment, and/or a higher-level data unit that will include a frame with the MAC address of the host system.

In some examples, probing module 108 may transmit probing frames from multiple host systems within the plurality of host systems to the host system at the same time. For example, an agent including probing module 108 installed on each host system within the plurality of host systems may transmit a probing frame from all host systems within the plurality of host systems except for the host system. Using FIG. 4 as an example, probing module 108 may cause hosts 412, 414, 416, 418, 422, 426, 432, 434, 436, 438, 442, 444, 446, 448, 452, and 454 to each transmit a probing frame to host 424 after a training period for host 424. Alternatively, some host systems within the plurality of host systems may enter a training period after which the remaining host systems within the plurality of host systems may transmit probing frames destined for each host system that had trained its direct network switch. For example, half of the host systems may operate as training host systems while the other half may operate as probing host systems. Using FIG. 4 as an example, if hosts 414, 418, 424, 432, 436, 442, 446, and 452 enter a training period, probing module 108 may transmit probing frames from each of hosts 412, 416, 422, 426, 434, 438, 444, 448, and 454 addressed to each of hosts 414, 418, 424, 432, 436, 442, 446, and 452 after the training period. In this manner, the systems described herein may generate more relevant topological data for the network simultaneously.

Returning to FIG. 3, at step 312 one or more of the systems described herein may identify a subset of host systems within the plurality of host systems that received the probing frame. For example, at step 312 mapping module 110 may, as part of host systems 210(1)-(n) in FIG. 2, identify a subset of host systems within the plurality of host systems that received probing frame 216. Using FIG. 4 as an additional example, at step 312 mapping module 110 may, as part of the various hosts in network 400, identify a subset of host systems including only host 424. As used herein, the phrase "subset of host systems" may refer a subset of any cardinality, including a subset of only one host system.

Mapping module 110 may identify the subset of host systems in any suitable manner. For example, an agent including mapping module 110 may execute on each host system in the plurality of host systems. The instance of mapping module 110 on each host system may inspect incoming frames for the probing frame. The instances of mapping module 110 may then communicate to pool information regarding which host systems received the probing frame.

At step 314, one or more of the systems described herein may map a topology of the network based at least in part on the identified subset. For example, at step 314 mapping module 110 may, as part of one or more of host systems 210(1)-(n) in FIG. 2, map a topology of network 204 based at least in part on the identified subset of host systems that received probing frame 216. Using FIG. 4 as an example, at step 314 mapping module 110 may, as part of one or more of the various hosts in network 400, map a topology of network 400 based at least in part on the identified subset that including only host 424.

As used herein, the term "topology" may refer to any information relating to the structure and/or interconnection of one or more of the plurality of host systems and one or more of the plurality of network switches. In some examples, the term "topology" may refer to a layer-2 topology.

Mapping module 110 may map the topology of the network in any suitable manner. For example, mapping module 110 may create a graph data structure, a relational data structure, and/or any other data structure capable of representing the topology of the network. Generally, mapping module 110 may map the topology of the network by generating any kind of topological information or information isomorphic to topological information. Examples of such information include, without limitation, which host systems are connected to which switches, which switches are interconnected, which hosts share a switch, the number of switches in the network, how many hosts a switch has, and how many switches are between two given hosts. In some examples, mapping module 110 may create a complete map of the topology of the network. Additionally or alternatively, mapping module 110 may create only a partial map of the topology of the network.

Mapping module 110 may use the identified subset to map the topology of the network in a variety of ways. For example, in one case mapping module 110 may determine that the subset of host systems only includes the host system. In this case mapping module 110 may determine that the probing host system is connected to the network via the network switch (i.e., the same network switch as the host system). Using FIG. 4 as an example, host 424 may enter a training period, refreshing its address in switch 420 (e.g., by sending training frames addressed to itself) and allowing its address to expire in switches 410, 430, 440, and 450. Host 426 may then send a probing frame to the address of host 424. When switch 420 receives the probing frame from host 426, switch 420 may find the destination address in a forwarding table (since host 424 refreshed the address during the training period). Accordingly, switch 420 may forward the probing frame directly to host 424 instead of flooding all ports with the probing frame. Since any other switch may have flooded the probing frame (since host 424 had allowed its address to expire from all other switches during the training period), mapping module 110 may infer that host 424 and host 426 share a switch.

In some examples, mapping module 110 may determine that the subset of host systems only includes the host system but that the probing host system is not directly connected to the network switch (i.e., the same switch as the host system). For example, if, in another iteration of the method described above, the host system and the probing host system switch roles (the host system acting as a new probing host system and the probing host system acting as a new training host system) and the new resulting subset of host systems does not include only the new host system, mapping module 110 may infer that the new host system (e.g., the original probing host system) is the only host system on a branch from the new probing system (e.g., the original host system).

Figure 6:
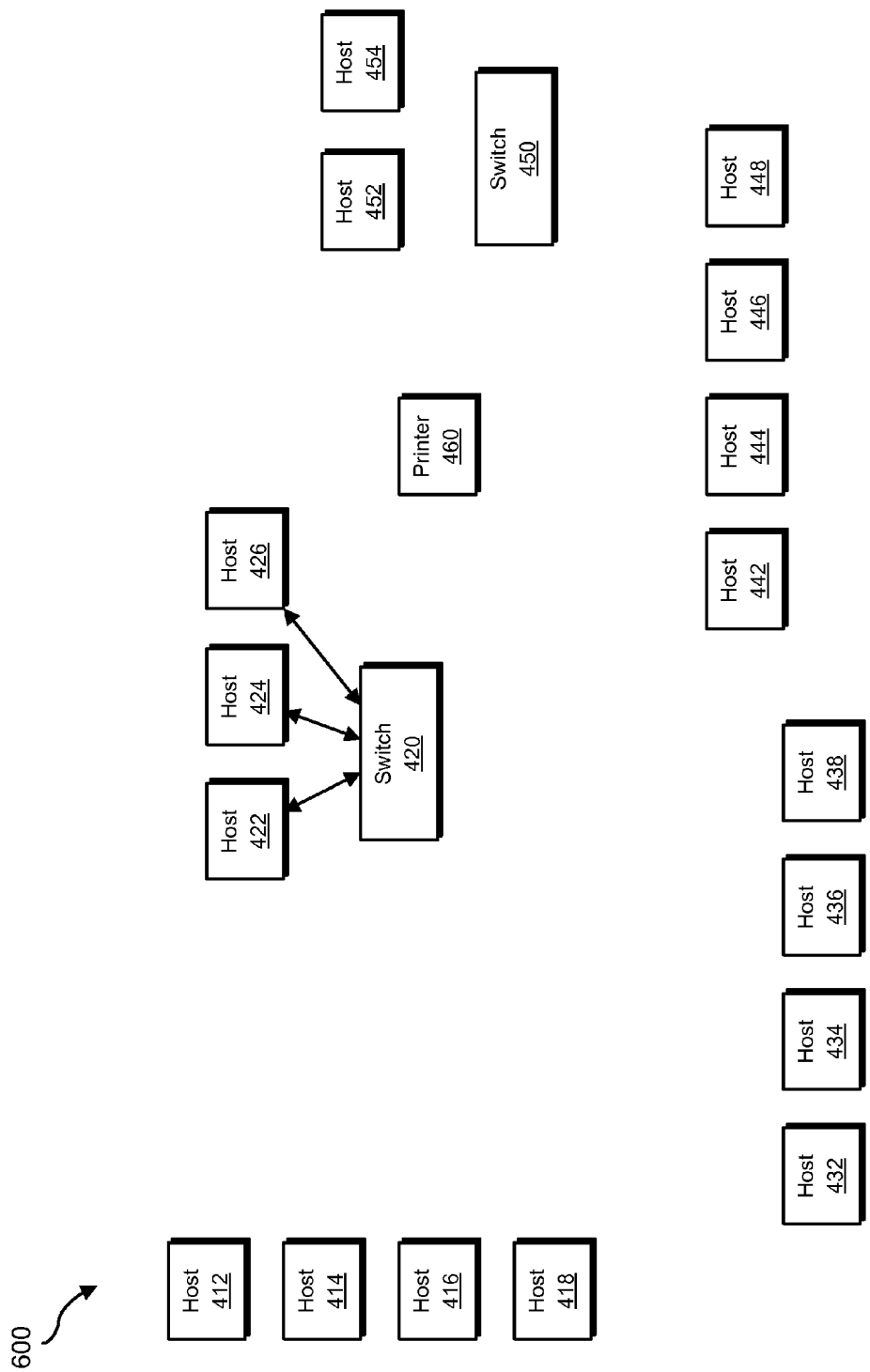
FIG. 6 is a block diagram of an exemplary network map.

As mentioned earlier, the systems described herein may send probing frames from multiple host systems and/or iterate the training and/or probing periods to gather additional topological information. FIG. 6 is a block diagram of an exemplary network map 600 of network 400. Using FIG. 6 as an example, after a training period executed by host 424, all other hosts in network 400 may have each transmitted a probing frame addressed to host 424. Mapping module 110 may then have identified, for each probing frame sent, a subset of host systems that received the probing frame. The probing frames sent by host 422 and host 426 may have only been received by host 424. Accordingly, mapping module 110 may determine that hosts 422, 424, and 426 share switch 420. Additionally, mapping module 110 may determine that no other host shares switch 420. Accordingly, mapping module 110 may generate network map 600.

Figure 7:
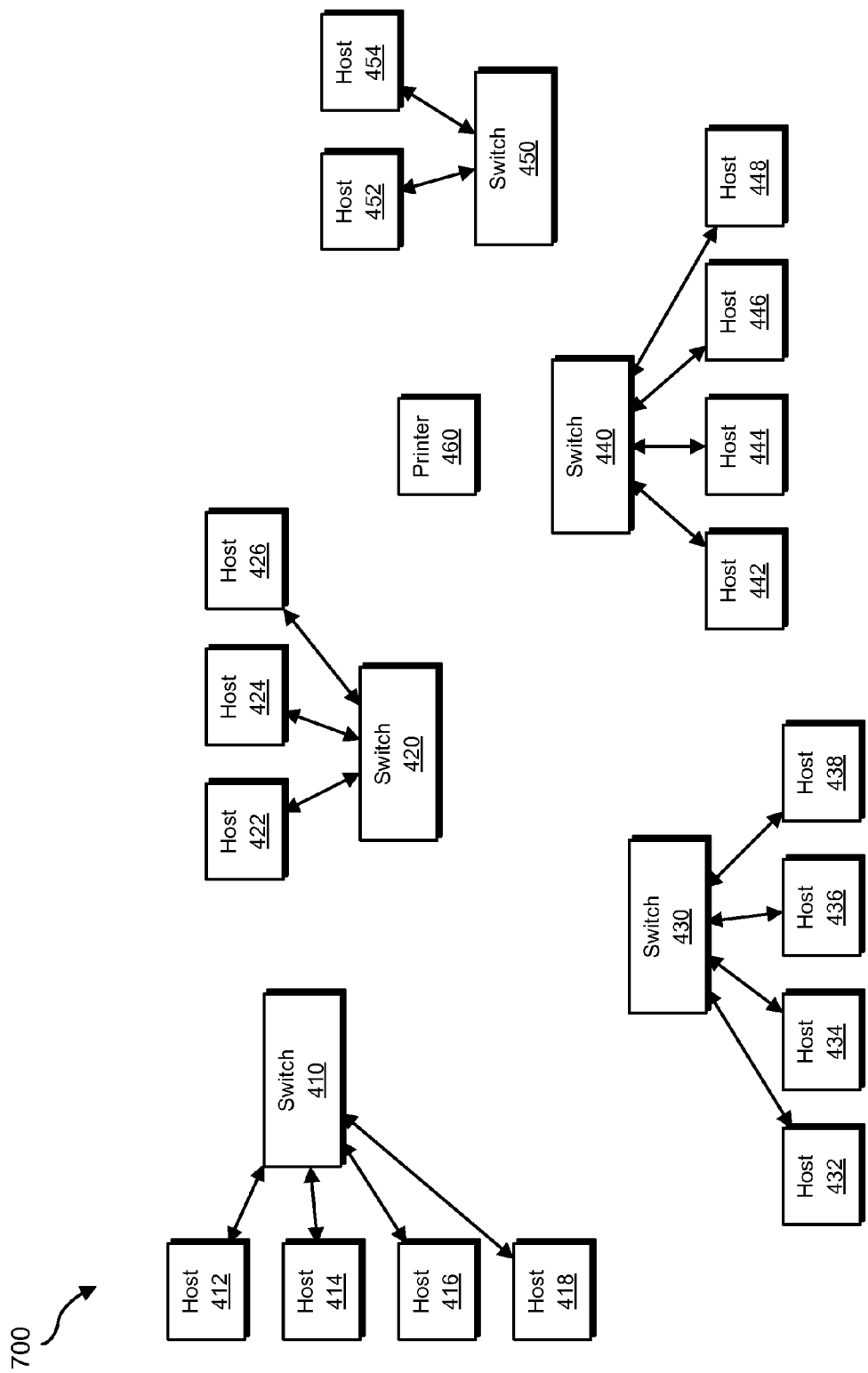
FIG. 7 is a block diagram of an exemplary network map.

The systems described herein may iterate the above-described processes for multiple host systems. For example, the systems described herein may perform training periods from various host systems in the network. For example, FIG. 7 is a block diagram of an exemplary network map 700 of network 400. One or more of the systems described herein may have replicated the training and probing steps as performed by host 424 and hosts 422 and 426, respectively, to the remaining host systems on network 400. Mapping module 110 may then use subsequently identified subsets of hosts that received the various probing frames to create network map 700.

In another case, mapping module 110 may use the identified subset to map a topology of the network by determining that the subset of host systems does not only include the host system. Mapping module 110 may then, based on this determination, further determine that the subset of host systems, excepting the host system, belongs to a common branch of the network with the probing host system, with the common branch extending from the network switch as a root of the network.

Figure 8:
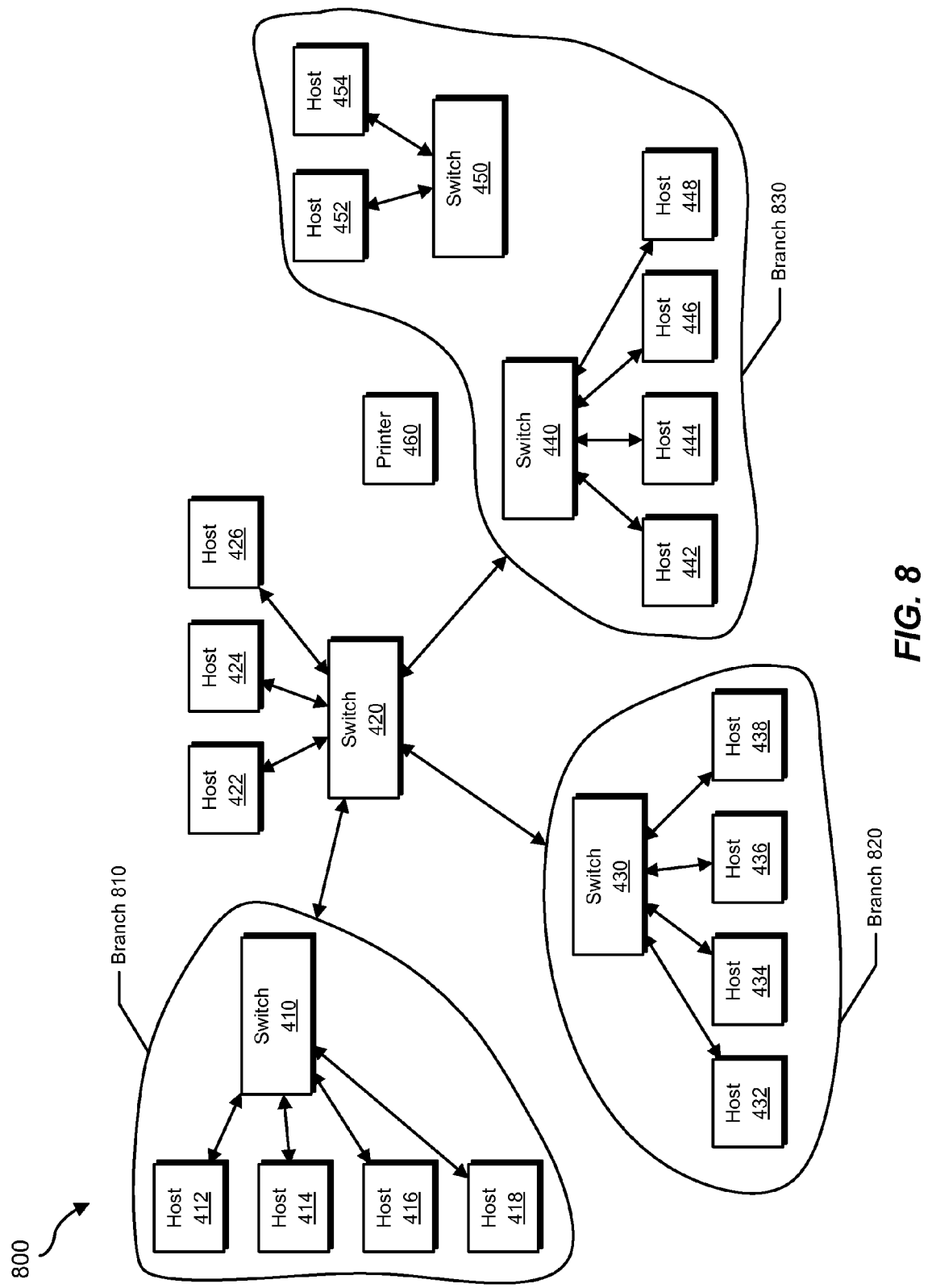
FIG. 8 is a block diagram of an exemplary network map.

For example, FIG. 8 is a block diagram of an exemplary network map 800 of network 400. Host 424 may have entered a training period and the remaining host systems of network 400 may have each transmitted a probing frame addressed to host 424 following the training period. Since the forwarding table of switch 420 may include the address of host 424, switch 420 may forward any of the probing frames that reach it to host 424 rather than flooding the probing frames to all ports (e.g., to hosts 422 and 426 and to switches 410, 430, and 440). Accordingly, excepting host 424, probing frames sent to the address of host 424 from the hosts of switch 410 (i.e., hosts 412, 414, 416, and 418) may only arrive at the remaining hosts of switch 410. Mapping module 110 may accordingly surmise that switch 410 and its hosts belong to a branch 810 from switch 420. Likewise, mapping module 110 may surmise that switch 430 and its hosts belong to a branch 820 from switch 420. However, probing frames sent to the address of host 424 from the hosts of switch 440 may reach both the hosts of switch 440 and the hosts of switch 450. Likewise, probing frames from the hosts of switch 450 may reach both the hosts of switch 440 and the hosts of switch 450. Accordingly, mapping module 110 may surmise that switches 440 and 450 and their respective hosts belong to a common branch 830 from switch 420. Mapping module 110 may use this information to create network map 800.

Figure 9:
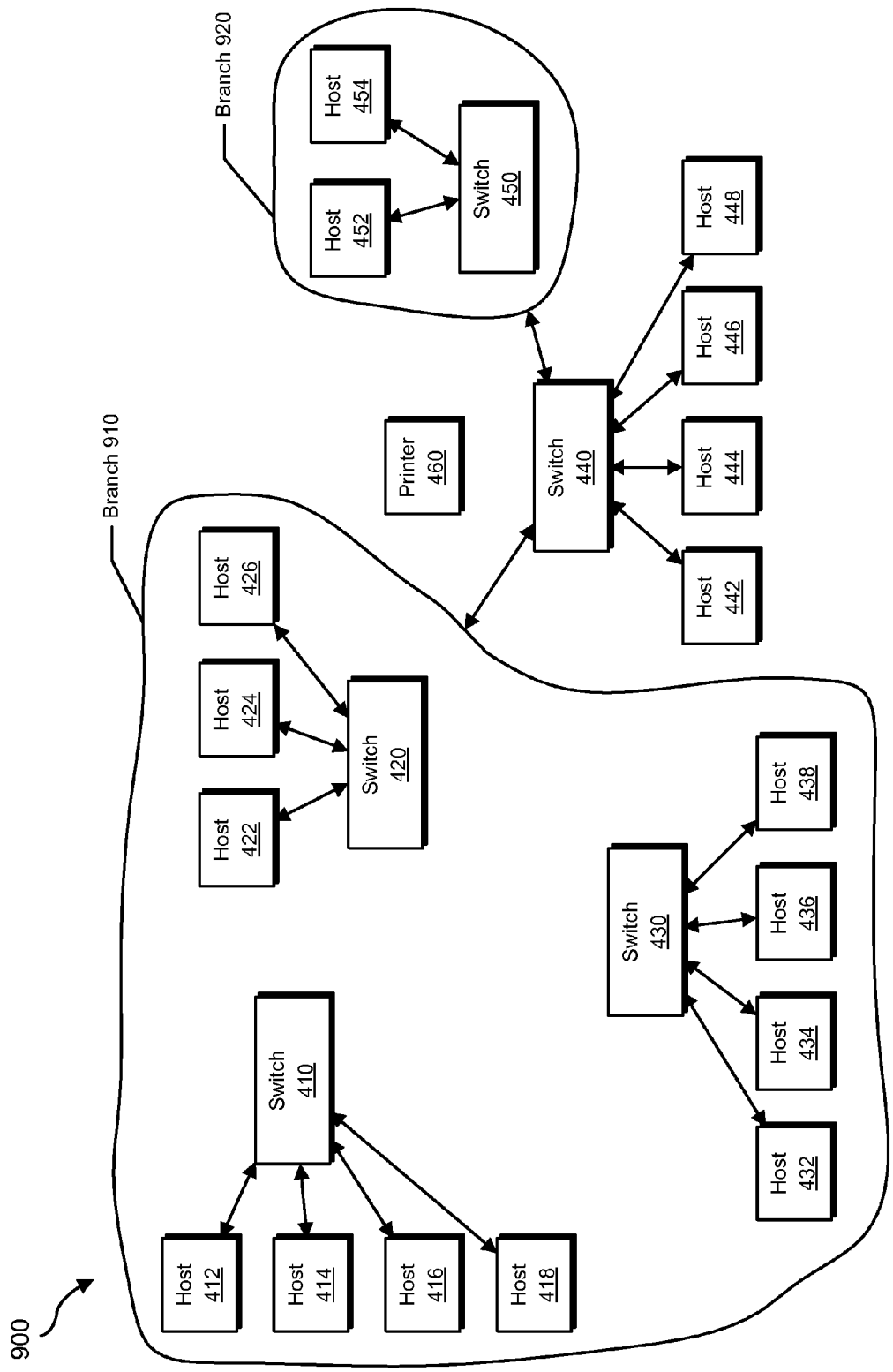
FIG. 9 is a block diagram of an exemplary network map.

FIG. 9 is a block diagram of an exemplary network map 900 of network 400. Using FIG. 9 as another example, the systems described herein may perform another iteration of the process described above. For example, host 448 may enter a training period, after which the remaining hosts in network 400 may each transmit a probing frame addressed to host 448. In this example, the forwarding table of switch 440 may include the address of host 448 and so preclude flooding probing frames destined for host 448 across switch 440. Accordingly, mapping module 110 may determine that subsets of hosts that receive each other's sent probing frames belong to a common branch from switch 440. For example, hosts 412, 414, 416, 418, 422, 424, 426, 432, 434, 436, and 438 may all receive each other's sent probing frames. Likewise, hosts 452 and 454 may receive each other's sent probing frames. Accordingly, mapping module 110 may determine that the host systems of switches 410, 420, and 430 belong to a common branch 910 from switch 440 and that the hosts of switch 450 belong to a common branch 920 from switch 440. Mapping module 110 may accordingly create network map 900.

Mapping module 110 may also combine the iterations of branch discovery discussed above to generate a more complete topology of the network. For example, from network map 800 mapping module 110 may determine how all the switches in network 400 connect except for switch 420 with the switches of branch 830 (i.e., judging from network map 800 alone, switch 420 may connect either to switch 440 or switch 450). However, network map 900 shows that switch 440 separates switch 420 from switch 450. Accordingly, mapping module 110 may combine the information from network maps 800 and 900 to generate a complete map representing network 400. In some examples, in order to ensure a complete and correct topology, the methods described above may iterate such that each host system within the plurality of host systems takes a turn training its respective network switch, after which the remaining host systems within the plurality of host systems may act as probing host systems. Mapping module 110 may then combine information from all iterations to arrive at a final topological representation of the network. After step 314, method 300 may terminate.

Figure 10:
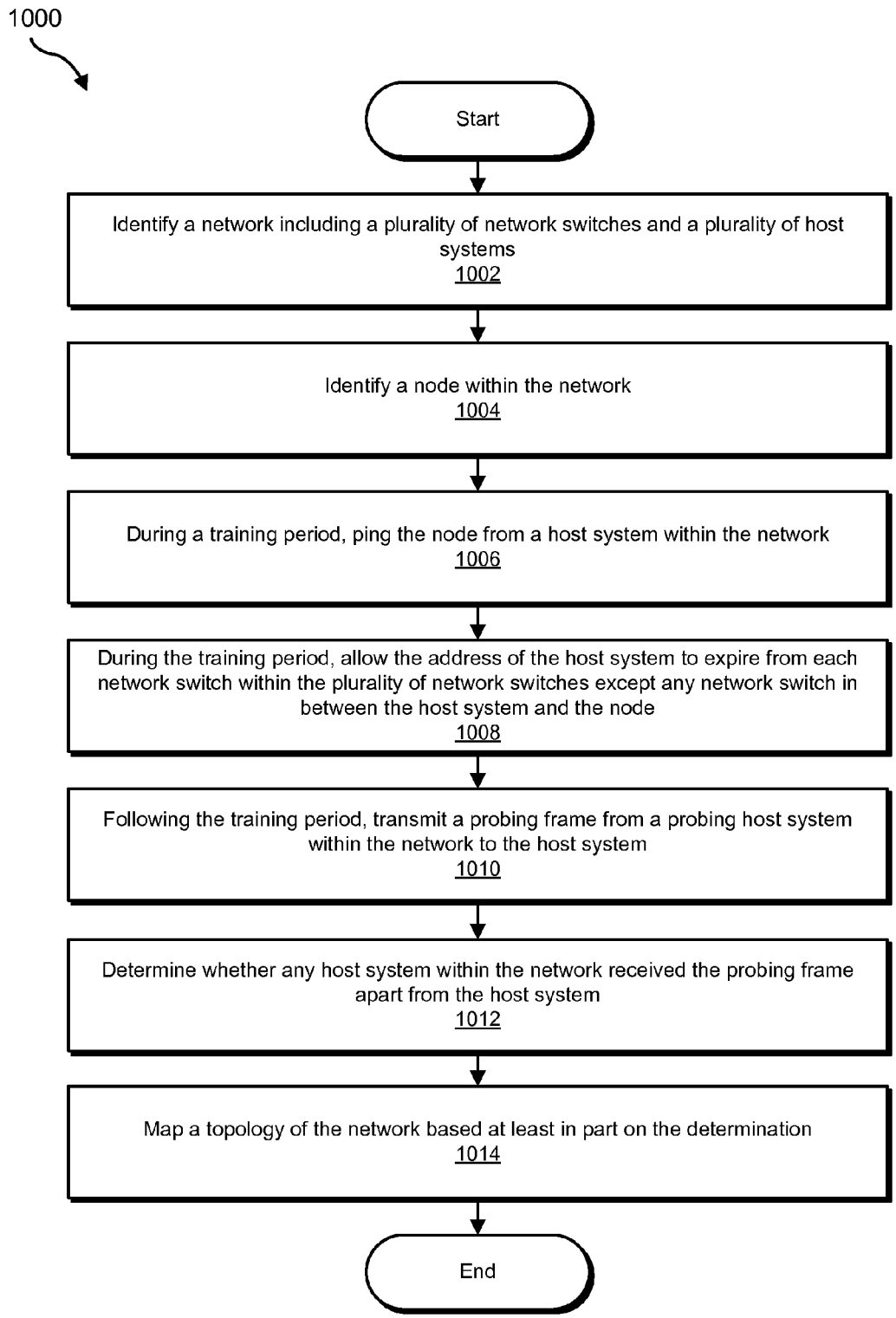
FIG. 10 is a flow diagram of an exemplary method for mapping network topologies.

FIG. 10 is a flow diagram of an exemplary computer-implemented method 1000 for mapping network topologies. The steps shown in FIG. 10 may be performed by any suitable computer-executable code and/or computing system. In some embodiments, the steps shown in FIG. 3 may be performed by one or more of the components of system 100 in FIG. 1, system 200 in FIG. 2, and/or network 400 in FIG. 4.

As illustrated in FIG. 10, at step 1002 one or more of the systems described herein may identify a network including a plurality of network switches and a plurality of host systems. For example, at step 1002 identification module 104 may identify network 400.

The network may have any suitable structure. In some examples, the network may include a tree network. As used herein, the phrase "tree network" may refer to any switched network with only one path between any two switches (and, accordingly, any two hosts). For example, the topology of a tree network may include no cycles. Using FIG. 4 as an example, exemplary network 400 may include switches 410, 420, 430, 440, and 450. Network 400 may represent a tree network since there are no cyclical paths between the switches. For example, there is a path from switch 420 to switch 430 and a path from switch 420 to switch 440 but no path from switch 430 to switch 440.

At step 1004 one or more of the systems described herein may identify a node within the network. For example, at step 1004 identification module 104 may, as part of one or more of the hosts illustrated in FIG. 4, identify printer 460.

As used herein, the term "node" may refer to any device and/or system capable of communicating on a network. For example, the term "node" may refer to any device capable of communicating via the Internet Protocol and/or responding to an ARP request. In some examples, the node may include a host that is not configured with one or more of modules 102. For example, the node may include a host on which an administrator cannot or does not wish to install on agent that includes one or more of modules 102. For example, the node may include a printer, a router, and/or a rogue host system (e.g., a host system not fully under the control of an administrator due to a permissions malfunction, malware, etc.). In some examples, the node may be configured to respond to a ping (e.g., a message designed to test whether a host on a network can be reached) or a message which may be effectively used as a ping. As used herein, the term "ping" may refer to any message designed to elicit a response from the receiver to the sender. For example, one system may "ping" another by sending a unicast address resolution protocol ("ARP") frame.

At step 1006, one or more of the systems described herein may, during a training period, ping the node from a host system within the network. For example, at step 1006 training module 106 may, as part of host 424 in FIG. 4, ping printer 460 from host 424.

By pinging the node from the host system and thereby causing the node to transmit a response to the host system, training module 106 may train all switches between the host system and the node with address of the node and the address of the host system. In this manner, training module 106 may ensure that these intermediate switches will retain the addresses of the node and the host system. Using FIG. 4 as an example, host 424 may ping printer 460 one or more times and thereby keep the address of printer 460 in the forwarding tables of the intermediate switches (i.e., switches 420 and 440).

Returning to FIG. 10, at step 1008 one or more of the systems described herein may, during the training period, allow the address of the host system to expire from each network switch within the plurality of network switches except any network switch in between the host system and the node. For example, at step 1008 training module 106 may, as part of host 424 in FIG. 4, allow the address of host 424 to expire from network switches 410, 430, and 450 (i.e., all network switches in network 400 except switches 420 and 440 which are between printer 460 from host 424).

Training module 106 may perform step 1008 in any suitable manner. For example, training module 106 may cause the host system to not transmit any frames on the network during the training period except frames used for pinging the node.

By ensuring that the intermediate switches between the node and the host system will retain the addresses of the node and the host system and by ensuring that all other switches on the network forget the address of the host system, training module 106 may prepare the network for a probing period as will be described in greater detail below. As may be seen in the following description, the systems and methods described herein may not rely on the address of the node expiring from any network switches. Accordingly, the systems and methods described herein may operate correctly even when the node may perform arbitrary communications across the network.

At step 1010, one or more of the systems described herein may, following the training period, transmit a probing frame from a probing host system within the network to the host system. For example, at step 1010 probing module 108 may, as part of host 446 in FIG. 4, transmit a probing frame from host 446 to host 424.

In some examples, multiple instances of probing module 108 on multiple host systems within the plurality of host systems may each transmit a probing frame to the address of the host system.

At step 1012, one or more of the systems described herein may determine whether any host system within the network received the probing frame apart from the host system. For example, at step 1012 mapping module 110 may, as a part of each host in FIG. 4, determine whether any host system within network 400 received the probing frame apart from host 424.

At step 1014, one or more of the systems described herein may map a topology of the network based at least in part on the determination. For example, at step 1014 mapping module 110 may map the topology of the network based at least partly on the determination of whether any host system within the network received the probing frame. For example, mapping module 110 may determine whether a network switch connecting the probing host system to the network lies on a path between the node and a network switch connecting the host system to the network.

Using FIG. 4 as an example, if host 424 repeatedly pings printer 460 but does not send other communications across the network over the training period, switches 420 and 440 may remember the address of host 424 while switches 410, 430, and 450 may forget the address of host 424. Accordingly, a probing frame sent by any host connected to switch 420 or 440 may result in only host 424 receiving the probing frame.

However, a probing frame sent by any host connected to switch 410, 430, or 450 may result in multiple hosts receiving the probing frame. Accordingly, mapping module 110 may determine that printer 460 must connect to network 400 via switch 420 or switch 440. By picking different hosts for training and iteratively narrowing possible switch paths, the systems described herein may determine to which switch the node directly connects. For example, the systems described herein may also cause host 452 to train the switches between host 452 and printer 460 by repeatedly pinging printer 460 from host 452 while causing host 452 to otherwise maintain network silence. These systems may then send probing frames from the various hosts in network 400 and determine that only probing frames sent from hosts connected to switches 440 and 450 are never flooded. Accordingly, mapping module 110 may determine that printer 460 must connect to network 400 via switch 440 or 450. By combining this determination with the previous determination that printer 460 must connect to network 400 via switch 420 or 440, mapping module 110 may deduce that printer 460 connects to network via switch 440. After step 1014, method 1000 may terminate.

By training some switches to retain certain host addresses while allowing host addresses within other switches to expire and then probing certain host addresses to detect frame flooding patterns, the systems and methods described herein may gather topological information on networks without relying on management protocols or MAC address spoofing. These systems and methods may therefore successfully map networks with unmanaged switches and/or with MAC filtering.

Figure 11:
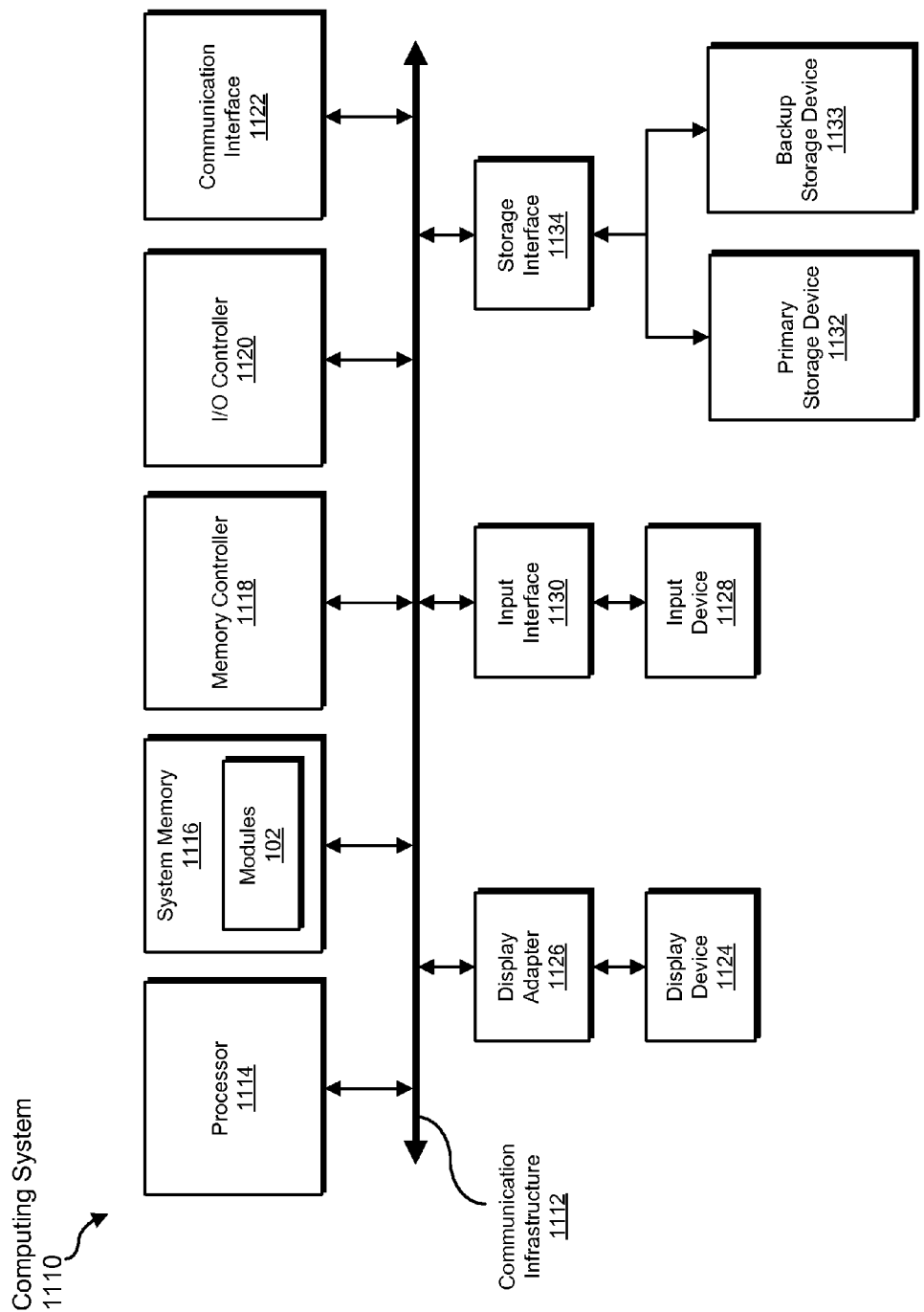
FIG. 11 is a block diagram of an exemplary computing system capable of implementing one or more of the embodiments described and/or illustrated herein.

FIG. 11 is a block diagram of an exemplary computing system 1110 capable of implementing one or more of the embodiments described and/or illustrated herein. Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114 and a system memory 1116.

Processor 1114 generally represents any type or form of processing unit capable of processing data or interpreting and executing instructions. In certain embodiments, processor 1114 may receive instructions from a software application or module. These instructions may cause processor 1114 to perform the functions of one or more of the exemplary embodiments described and/or illustrated herein. For example, processor 1114 may perform and/or be a means for performing, either alone or in combination with other elements, one or more of the identifying, refreshing, transmitting, allowing, waiting, mapping, determining, and/or pinging steps described herein. Processor 1114 may also perform and/or be a means for performing any other steps, methods, or processes described and/or illustrated herein.

System memory 1116 generally represents any type or form of volatile or non-volatile storage device or medium capable of storing data and/or other computer-readable instructions. Examples of system memory 1116 include, without limitation, random access memory (RAM), read only memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below). In one example, one or more of modules 102 from FIG. 1 may be loaded into system memory 1116.

In certain embodiments, exemplary computing system 1110 may also include one or more components or elements in addition to processor 1114 and system memory 1116. For example, as illustrated in FIG. 11, computing system 1110 may include a memory controller 1118, an input/output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an ISA, PCI, PCIe, or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112. In certain embodiments, memory controller 1118 may perform and/or be a means for performing, either alone or in combination with other elements, one or more of the steps or features described and/or illustrated herein, such as identifying, refreshing, transmitting, allowing, waiting, mapping, determining, and/or pinging.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134. I/O controller 1120 may be used, for example, to perform and/or be a means for performing, either alone or in combination with other elements, one or more of the identifying, refreshing, transmitting, allowing, waiting, mapping, determining, and/or pinging steps described herein. I/O controller 1120 may also be used to perform and/or be a means for performing other steps and features set forth in the instant disclosure.

Communication interface 1122 broadly represents any type or form of communication device or adapter capable of facilitating communication between exemplary computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution. In certain embodiments, communication interface 1122 may perform and/or be a means for performing, either alone or in combination with other elements, one or more of the identifying, refreshing, transmitting, allowing, waiting, mapping, determining, and/or pinging steps disclosed herein. Communication interface 1122 may also be used to perform and/or be a means for performing other steps and features set forth in the instant disclosure.

As illustrated in FIG. 11, computing system 1110 may also include at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also include at least one input device 1128 coupled to communication infrastructure 1112 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, or any other input device. In at least one embodiment, input device 1128 may perform and/or be a means for performing, either alone or in combination with other elements, one or more of the identifying, refreshing, transmitting, allowing, waiting, mapping, determining, and/or pinging steps disclosed herein. Input device 1128 may also be used to perform and/or be a means for performing other steps and features set forth in the instant disclosure.

As illustrated in FIG. 11, exemplary computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

In certain embodiments, storage devices 1132 and 1133 may be used, for example, to perform and/or be a means for performing, either alone or in combination with other elements, one or more of the identifying, refreshing, transmitting, allowing, waiting, mapping, determining, and/or pinging steps disclosed herein. Storage devices 1132 and 1133 may also be used to perform and/or be a means for performing other steps and features set forth in the instant disclosure.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1110 may be configured as an application specific integrated circuit (ASIC) adapted to implement one or more of the exemplary embodiments disclosed herein.

Figure 12:
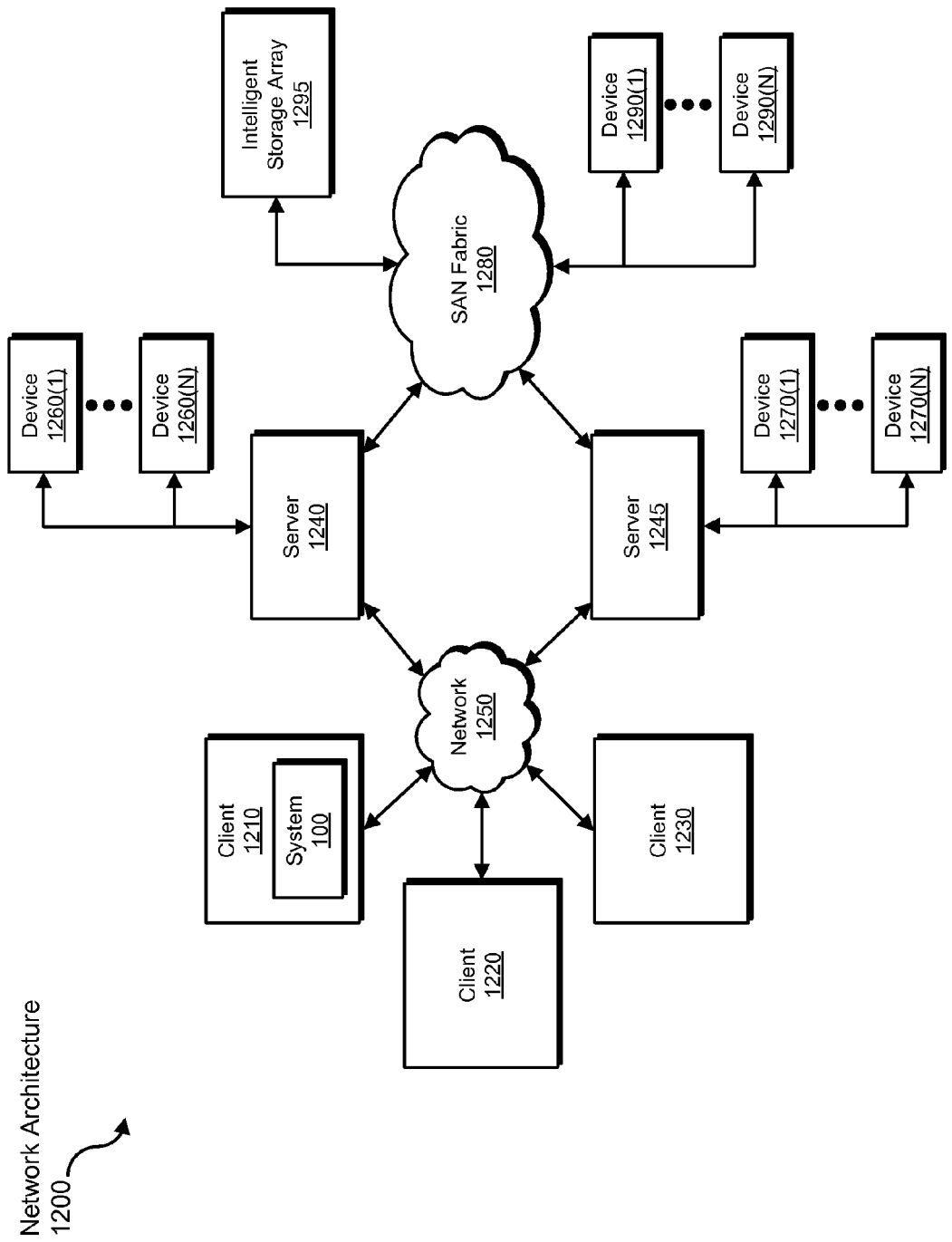
FIG. 12 is a block diagram of an exemplary computing network capable of implementing one or more of the embodiments described and/or illustrated herein.

FIG. 12 is a block diagram of an exemplary network architecture 1200 in which client systems 1210, 1220, and 1230 and servers 1240 and 1245 may be coupled to a network 1250. Client systems 1210, 1220, and 1230 generally represent any type or form of computing device or system, such as exemplary computing system 1110 in FIG. 11. In one example, client system 1210 may include system 100 from FIG. 1.

Similarly, servers 1240 and 1245 generally represent computing devices or systems, such as application servers or database servers, configured to provide various database services and/or run certain software applications. Network 1250 generally represents any telecommunication or computer network including, for example, an intranet, a wide area network (WAN), a local area network (LAN), a personal area network (PAN), or the Internet.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent network-attached storage (NAS) devices configured to communicate with servers 1240 and 1245 using various protocols, such as NFS, SMB, or CIFS.

Servers 1240 and 1245 may also be connected to a storage area network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to exemplary computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the exemplary embodiments disclosed herein may also be encoded as a computer program, stored in server 1240, run by server 1245, and distributed to client systems 1210, 1220, and 1230 over network 1250. Accordingly, network architecture 1200 may perform and/or be a means for performing, either alone or in combination with other elements, one or more of the identifying, refreshing, transmitting, allowing, waiting, mapping, determining, and/or pinging steps disclosed herein. Network architecture 1200 may also be used to perform and/or be a means for performing other steps and features set forth in the instant disclosure.

As detailed above, computing system 1110 and/or one or more components of network architecture 1200 may perform and/or be a means for performing, either alone or in combination with other elements, one or more steps of an exemplary method for mapping network topologies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a network into a self-mapping network.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for mapping network topologies, at least a portion of the method being performed by a computing device comprising at least one processor, the method comprising:
    identifying a network comprising a plurality of host systems that are connected via a plurality of network switches, wherein the plurality of network switches comprises each and every network switch within the network;
    identifying a training host system within the plurality of host systems connected to the network via a network switch within the plurality of network switches;
    during a training period:
        refreshing an address of the training host system within the network switch;
        ensuring that the address of the training host system expires from each and every network switch within the network except the network switch;
    in response to completion of the training period:
        transmitting a probing frame from a probing host system within the plurality of host systems to the address of the training host system, the probing host system being separate and distinct from the training host system;
        identifying a subset of host systems within the plurality of host systems that received the probing frame;
        mapping a topology of the network based at least in part on the identified subset.

2. The computer-implemented method of claim 1, wherein refreshing the address of the training host system comprises transmitting from the training host system at least one training frame addressed to the training host system.

3. The computer-implemented method of claim 1, wherein ensuring that the address of the training host system expires from each and every network switch within the network except the network switch comprises transmitting no frames from the training host system during the training period that are not addressed to the training host system.

4. The computer-implemented method of claim 1, wherein ensuring that the address of the training host system expires from each and every network switch within the network except the network switch comprises intentionally waiting for a predetermined amount of time during the training period so that the address of the training host system expires from each network switch within the plurality of network switches except the network switch.

5. The computer-implemented method of claim 1, wherein:
    refreshing the address of the training host system comprises transmitting from the training host system at least one training frame addressed from the training host system to the network switch so that a forwarding table of the network switch contains the address of the training host system;
    ensuring that the address of the training host system expires from each and every network switch within the network except the network switch comprises transmitting, while refreshing the address of the training host system, no frames addressed from the training host system that would reach any network switch within the plurality of network switches except the network switch so that a forwarding table of each network switch within the plurality of network switches except the network switch does not contain the address of the training host system.

6. The computer-implemented method of claim 1, wherein the network comprises a tree network.

7. The computer-implemented method of claim 1, wherein mapping the topology of the network comprises:
- determining that the subset of host systems only comprises the training host system;
- determining that the probing host system is connected to the network via the network switch.

8. The computer-implemented method of claim 1, wherein mapping the topology of the network comprises:
- determining that the subset of host systems does not only comprise the training host system;
- determining that the subset of host systems, excepting the training host system, belongs to a common branch of the network with the probing host system, the common branch extending from the network switch as a root of the network.

9. A system for mapping network topologies, the system comprising:
- an identification module programmed to:
  - identify a network comprising a plurality of host systems that are connected via a plurality of network switches, wherein the plurality of network switches comprises each and every network switch within the network;
  - identify a training host system within the plurality of host systems connected to the network via a network switch within the plurality of network switches;
- a training module programmed to, during a training period:
  - refresh an address of the training host system within the network switch;
  - ensure that the address of the training host system expires from each and every network switch within the network except the network switch;
- a probing module programmed to, in response to completion of the training period, transmit a probing frame from a probing host system within the plurality of host systems to the address of the training host system, the probing host system being separate and distinct from the training host system;
- a mapping module programmed to:
  - identify a subset of host systems within the plurality of host systems that received the probing frame;
  - map a topology of the network based at least in part on the identified subset;
- at least one processor configured to execute the identification module, the training module, the probing module, and the mapping module.

10. The system of claim 9, wherein the training module is programmed to refresh the address of the training host system by transmitting from the training host system at least one training frame addressed to the training host system.

11. The system of claim 9, wherein the training module is programmed to ensure that the address of the training host system expires from each and every network switch within the network except the network switch by transmitting no frames from the training host system during the training period that are not addressed to the training host system.

12. The system of claim 9, wherein the training module is programmed to ensure that the address of the training host system expires from each and every network switch within the network except the network switch by intentionally waiting for a predetermined amount of time during the training period so that the address of the training host system expires from each network switch within the plurality of network switches except the network switch.

13. The system of claim 9, wherein the training module is programmed to:
- refresh the address of the training host system by transmitting from the training host system at least one training frame addressed from the training host system to the network switch so that a forwarding table of the network switch contains the address of the training host system;
- ensure that the address of the training host system expires from each and every network switch within the network except the network switch by transmitting, while refreshing the address of the training host system, no frames addressed from the training host system that would reach any network switch within the plurality of network switches except the network switch so that a forwarding table of each network switch within the plurality of network switches except the network switch does not contain the address of the training host system.

14. The system of claim 9, wherein the network comprises a tree network.

* * * * *